(12) United States Patent
Cho et al.

(10) Patent No.: US 12,503,018 B2
(45) Date of Patent: Dec. 23, 2025

(54) VEHICLE FOLDABLE SEAT

(71) Applicant: HYUNDAI TRANSYS INC., Seosan-si (KR)

(72) Inventors: Jae Hoon Cho, Hwaseong-si (KR); Won Young Lee, Hwaseong-si (KR); Jae Won Jo, Hwaseong-si (KR); Hae Dong Kwak, Hwaseong-si (KR); Han Kyung Park, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 155 days.

(21) Appl. No.: 18/492,099

(22) Filed: Oct. 23, 2023

(65) Prior Publication Data

US 2024/0140280 A1 May 2, 2024

(30) Foreign Application Priority Data

Oct. 27, 2022 (KR) .................. 10-2022-0140063

(51) Int. Cl.
*B60N 2/30* (2006.01)

(52) U.S. Cl.
CPC ........... *B60N 2/3047* (2013.01); *B60N 2/309* (2013.01)

(58) Field of Classification Search
CPC ........ B60N 2/3047; B60N 2/14; B60N 2/933; B60N 2002/952; B60N 2002/022; B60N 2/309; A47C 7/56
USPC ................................................ 297/332, 333
See application file for complete search history.

(56) References Cited

U.S. PATENT DOCUMENTS

| | | | | | |
|---|---|---|---|---|---|
| 3,594,037 | A | * | 7/1971 | Sherman | A47C 7/56 297/14 |
| 4,460,215 | A | * | 7/1984 | Chamberlain | A47C 9/06 297/14 |
| 5,328,239 | A | * | 7/1994 | Yamazaki | B60N 2/3065 297/333 |
| 5,918,937 | A | * | 7/1999 | Moffa | B60N 2/3047 297/331 |
| 7,578,537 | B2 | * | 8/2009 | Baetz | B60N 2/3013 296/65.09 |
| 10,336,221 | B2 | * | 7/2019 | Hoover | B60N 2/3047 |

FOREIGN PATENT DOCUMENTS

| | | | | |
|---|---|---|---|---|
| DE | 19630214 C1 | * | 9/1997 | .......... B60N 2/3047 |
| JP | 05-049471 A | | 6/1993 | |
| JP | 08-142726 A | | 6/1996 | |

OTHER PUBLICATIONS

Office Action from corresponding application KR10-2022-0140063 dated Apr. 26, 2024.

* cited by examiner

*Primary Examiner* — Milton Nelson, Jr.
(74) *Attorney, Agent, or Firm* — Quantum Patent Law Firm; Seongyoune Kang (57) ABSTRACT

A vehicle foldable seat includes a seatback unit fixed to a vehicle body and coupled to a headrest and a seat cushion unit rotatably connected to the seatback unit. The seat cushion unit is fixed by elastic force in a stowing position, is selectively switched to a seating position when fixation thereof is released, and is engaged with the seatback unit to be fixed in the seating position.

10 Claims, 10 Drawing Sheets

VEHICLE FOLDABLE SEAT

CROSS-REFERENCE TO RELATED APPLICATION

This application claims, under 35 U.S.C. § 119(a), the benefit of priority from Korean Patent Application No. 10-2022-0140063, filed on Oct. 27, 2022, the entire contents of which are incorporated herein by reference.

BACKGROUND

(a) Technical Field

The present disclosure relates to a vehicle foldable seat. More particularly, it relates to a vehicle foldable seat configured to secure an interior space by reducing a protruding length of the foldable seat disposed in a vehicle.

(b) Background Art

In general, a vehicle seat is installed in a vehicle to support the body of an occupant, reduce fatigue caused by driving, and provide a comfortable ride. The vehicle seat is formed of a seat cushion supporting the buttocks of an occupant, a seatback connected to the seat cushion and configured to allow an occupant to adjust an angle thereof, and a headrest supporting the head of an occupant.

The vehicle seat is applicable to all types of vehicles. For example, in the case of a seat applied to an ultra-low-floor bus, a seat having a folding structure may be selectively applied to the ultra-low-floor bus together with a general seat.

That is, in the case of an ultra-low-floor bus including a wheelchair boarding device, the floor surface of the bus is low and the wheelchair boarding device is provided to connect the floor surface of the bus to the road. Accordingly, the ultra-low-floor bus is popular among people using wheelchairs as a very convenient means of transportation.

Particularly, the ultra-low-floor bus has a separate space provided to allow a wheelchair to be placed therein. Further, the ultra-low-floor bus has a foldable seat installed in the separate space and configured to be folded and unfolded as necessary, thereby allowing another passenger to be seated on the foldable seat when the wheelchair is not used in the separate space.

This foldable seat has a double unfolding structure. When the wheelchair is placed in the separate space, a seatback of the foldable seat is first folded, and then the seatback is folded up to a seat cushion so as to adhere to the side of the bus. In this manner, the wheelchair may be placed in the space (non-seating mode). In addition, when there is no wheelchair placed in the space, the foldable seat is unfolded so as to allow another passenger to be seated thereon (seating mode).

However, in the non-seating mode as described above, the size of the foldable seat protruding from the side of the bus is so large that the interior space of the bus is inevitably reduced as much as the space occupied by the foldable seat.

The above information disclosed in this Background section is only for enhancement of understanding of the background of the present disclosure, and therefore it may contain information that does not form the prior art that is already known in this country to a person of ordinary skill in the art.

SUMMARY OF THE DISCLOSURE

The present apparatus has been made in an effort to solve the above-described problems associated with the prior art, and it is an object of the present disclosure to provide a vehicle foldable seat having a stowing mode and seating mode. In the stowing mode, a seat cushion is placed in close contact with the vehicle body in the same manner as a seatback so as to stably fix the arrangement state of the seat cushion and the seatback using elastic force of an elastic member. In the seating mode, the seat cushion is axially rotated to form a right angle with the seatback, and a locking member is locked in a lower link, thereby allowing the seat cushion to be stably fixed in the seating mode. Accordingly, in the seating mode, it is possible to reliably support a seated occupant, and in the stowing mode, it is possible to reduce the protruding length of the seat in the interior space, thereby having an effect of effectively securing the interior space.

In one aspect, the present disclosure provides a vehicle foldable seat including a seatback unit fixed to a vehicle body, and a seat cushion unit rotatably connected to the seatback unit, wherein the seat cushion unit is fixed by elastic force in a stowing position, selectively switched to a seating position when fixation thereof is released, and engaged with the seatback unit to be fixed in the seating position.

In a preferred embodiment, the seat cushion unit may include a first link part connected to a first coupling guide mounted on one side of the seatback unit and rotated by the elastic force provided thereto, and a second link part configured to operate in conjunction with the first link part, connected to a second coupling guide mounted on the other side of the seatback unit, and formed to be selectively fixed at the seating position.

In another preferred embodiment, the first link part may include an upper link configured to connect the seat cushion unit to the first coupling guide, wherein the upper link is formed to have a variable connection angle by the elastic force provided thereto, and a lower link configured to connect the seat cushion unit to the first coupling guide, wherein the lower link is formed to assist rotation of the seat cushion unit when the connection angle of the upper link varies.

In still another preferred embodiment, the seatback unit may include an elastic member coupled to the first coupling guide and formed to extend to the upper link, wherein the elastic member provides the elastic force to vary the connection angle of the upper link.

In yet another preferred embodiment, the second link part may include an upper link configured to connect the seat cushion unit to the second coupling guide, wherein the upper link is formed to have a variable connection angle by the elastic force provided thereto, and a lower link configured to connect the seat cushion unit to the second coupling guide, wherein the lower link is connected to the first link part through a connecting bar formed to penetrate the seat cushion unit and formed to assist rotation of the seat cushion unit when the connection angle of the upper link varies.

In still yet another preferred embodiment, the lower link may include a locking area provided by a pair of locking protrusions spaced apart from each other and formed to protrude.

In a further preferred embodiment, the seatback unit may include a locking member rotatably coupled to the second coupling guide, wherein the locking member selectively limits rotation of the lower link when locked in the locking area, and an elastic member formed to provide the elastic force between the locking member and the lower link.

In another further preferred embodiment, the locking protrusion may have an outer circumferential surface formed to be rounded so as to have the same shape as a corner of the locking member inserted into the locking area.

In still another further preferred embodiment, the seatback unit may include an operating lever connected to the locking member by a connecting cable, wherein the operating lever is operated to rotate the locking member so that the lower link is unlocked from the locking area.

Other aspects and preferred embodiments of the present apparatus are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles powered by both gasoline and electricity.

The above and other features of the present apparatus are discussed infra.

BRIEF DESCRIPTION OF THE DRAWINGS

The above and other features of the present apparatus will now be described in detail with reference to certain exemplary embodiments thereof illustrated in the accompanying drawings which are given hereinbelow by way of illustration only, and thus are not limitative of the present apparatus, and wherein.

Reference numerals set forth in the Drawings includes reference to the following elements as further discussed below:

| | |
|---|---|
| 100: seatback unit | 102: first coupling guide |
| 104: second coupling guide | 110: headrest |
| 120, 140: elastic member | 130: locking member |
| 150: operating lever | 200: seat cushion unit |
| 202: connecting member | 204: connecting bar |
| 210: first link part | 212, 222: upper link |
| 214, 224: lower link | 220: second link part |

It should be understood that the appended drawings are not necessarily to scale, presenting a somewhat simplified representation of various preferred features illustrative of the basic principles of the present apparatus. The specific design features of the present apparatus as disclosed herein, including, for example, specific dimensions, orientations, locations, and shapes will be determined in part by the particular intended application and use environment.

In the figures, reference numbers refer to the same or equivalent parts of the present apparatus throughout the several figures of the drawing.

DETAILED DESCRIPTION

Hereinafter, reference will be made in detail to various embodiments of the present apparatus, examples of which are illustrated in the accompanying drawings and described below.

Advantages and features of the present apparatus and a method of achieving the same will become clear with reference to the embodiments described below in detail in conjunction with the accompanying drawings.

However, the present disclosure is not limited by the embodiments disclosed below, and may be implemented in various forms. The embodiments are provided to ensure that the disclosure of the present apparatus is complete, and to fully inform the scope of the present disclosure to those skilled in the art to which the present disclosure pertains, and the present apparatus is only defined by the scope of the claims.

Furthermore, in the description of the present apparatus, if it is determined that related known technologies may obscure the gist of the present apparatus, a detailed description thereof will be omitted.

Figure 1:
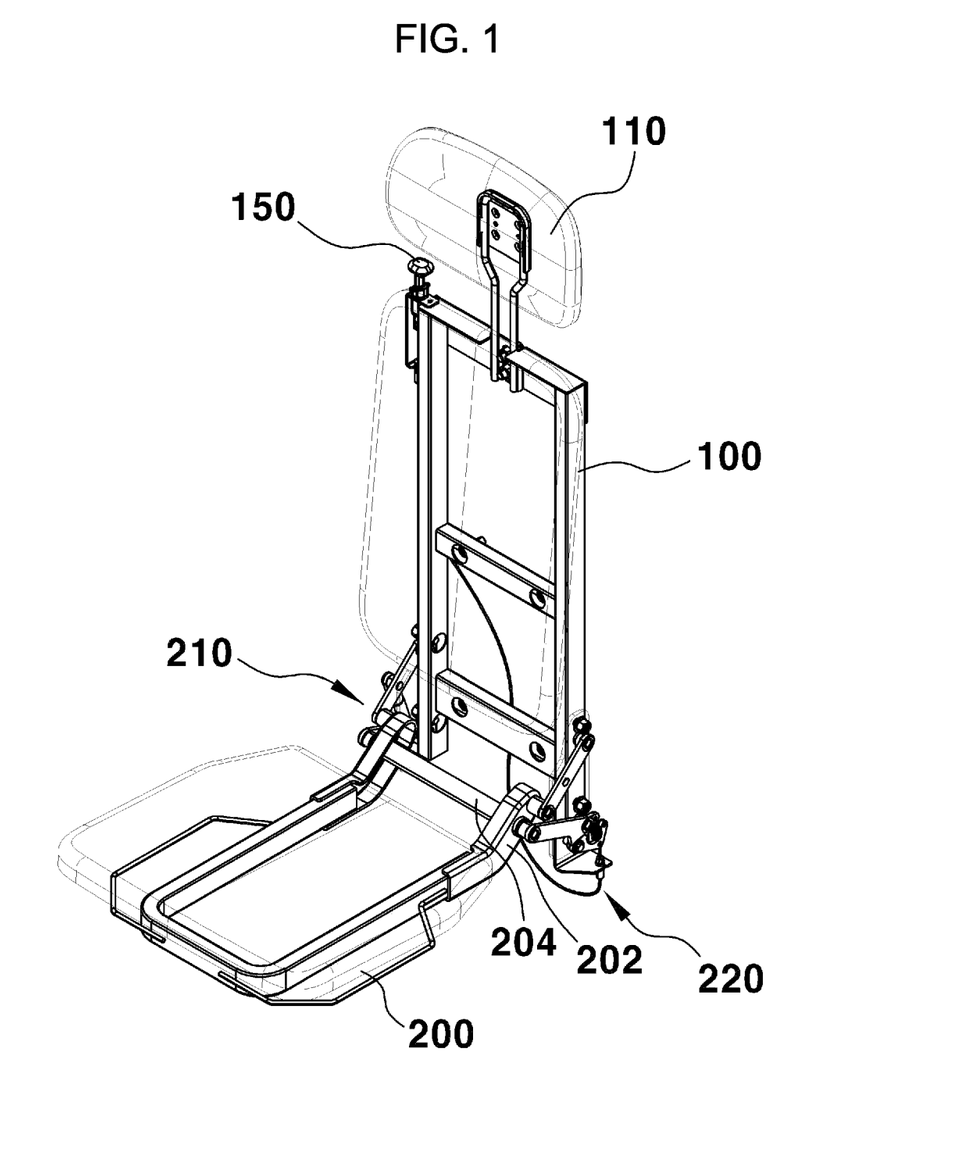
FIG. 1 is a view showing an overall configuration of a vehicle foldable seat according to an embodiment of the present apparatus.
Figure 2:
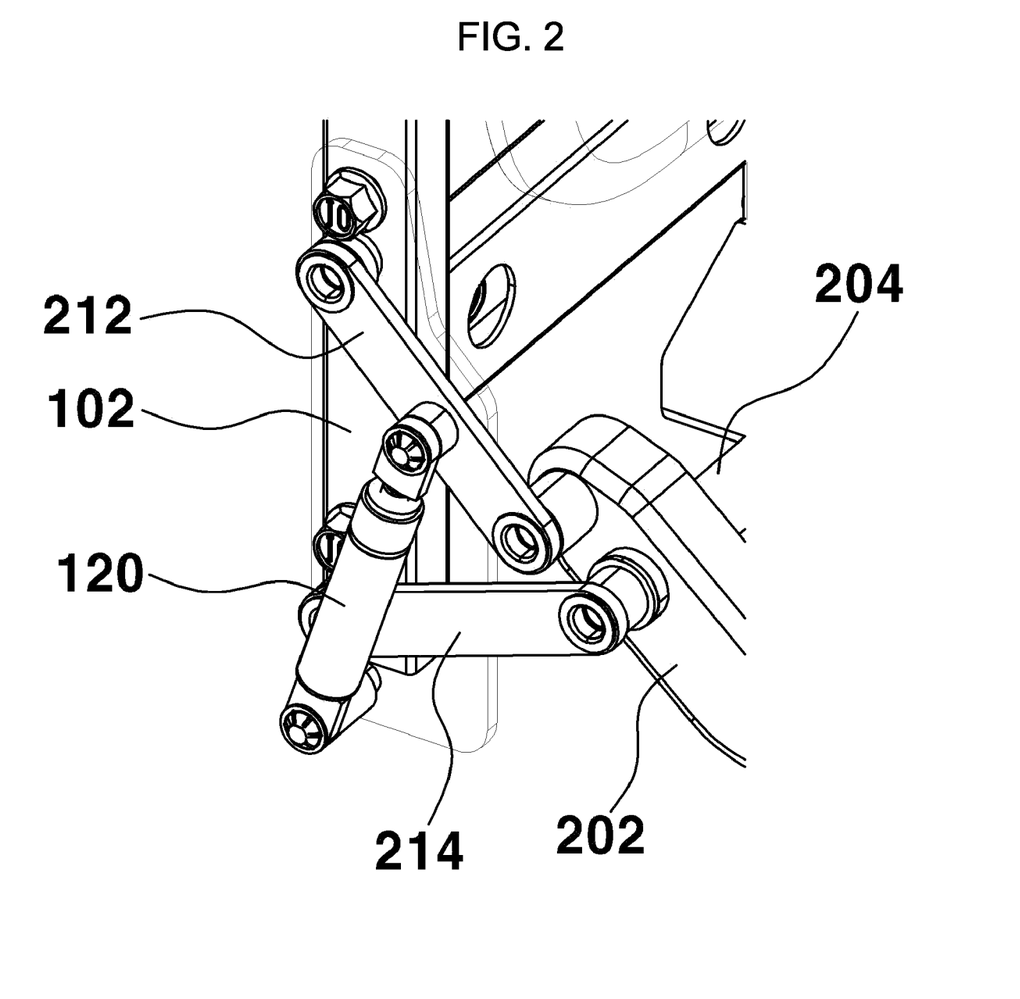
FIG. 2 is an enlarged view showing a configuration of a first link part for the vehicle foldable seat according to the embodiment of the present apparatus.
Figure 3:
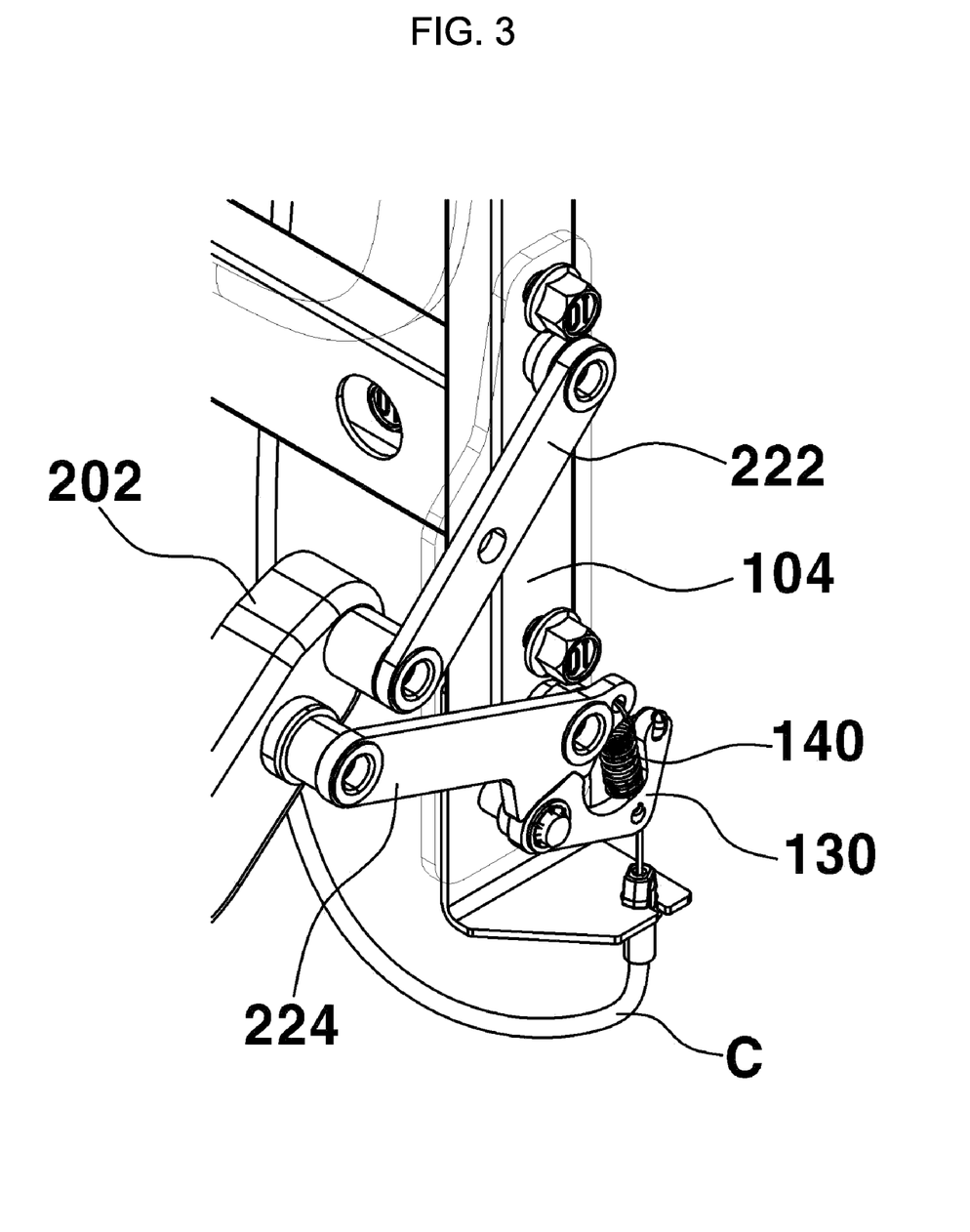
FIG. 3 is an enlarged view showing a configuration of a second link part for the vehicle foldable seat according to the embodiment of the present apparatus.

FIG. 1 is a view showing an overall configuration of a vehicle foldable seat according to an embodiment of the present apparatus, FIG. 2 is an enlarged view showing a configuration of a first link part for the vehicle foldable seat according to the embodiment of the present apparatus, and FIG. 3 is an enlarged view showing a configuration of a second link part for the vehicle foldable seat according to the embodiment of the present apparatus.

Figure 4:
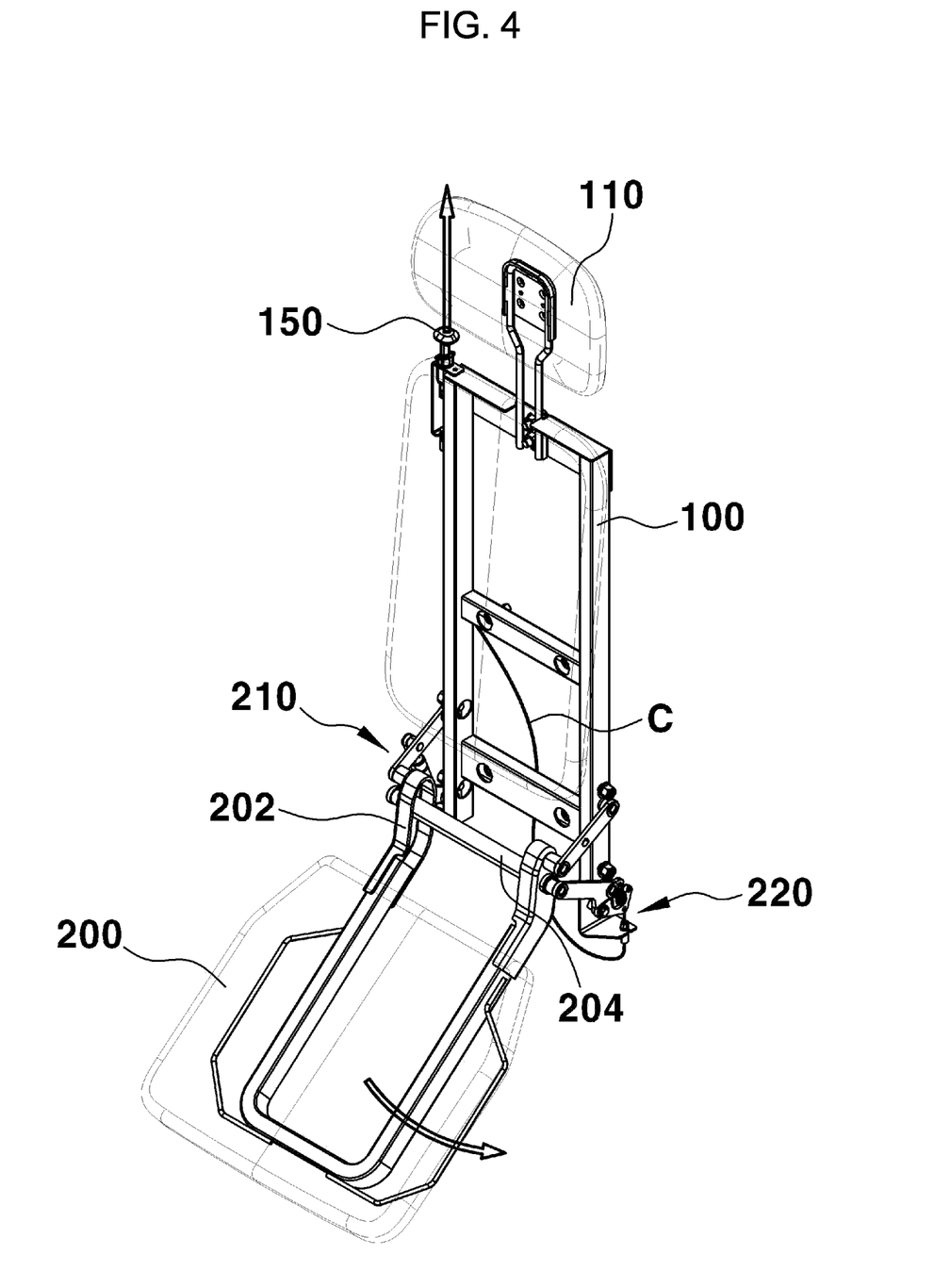
FIGS. 4 and 5 are views showing position switching from a seating position to a stowing position with respect to the vehicle foldable seat according to the embodiment of the present apparatus.
Figure 5:
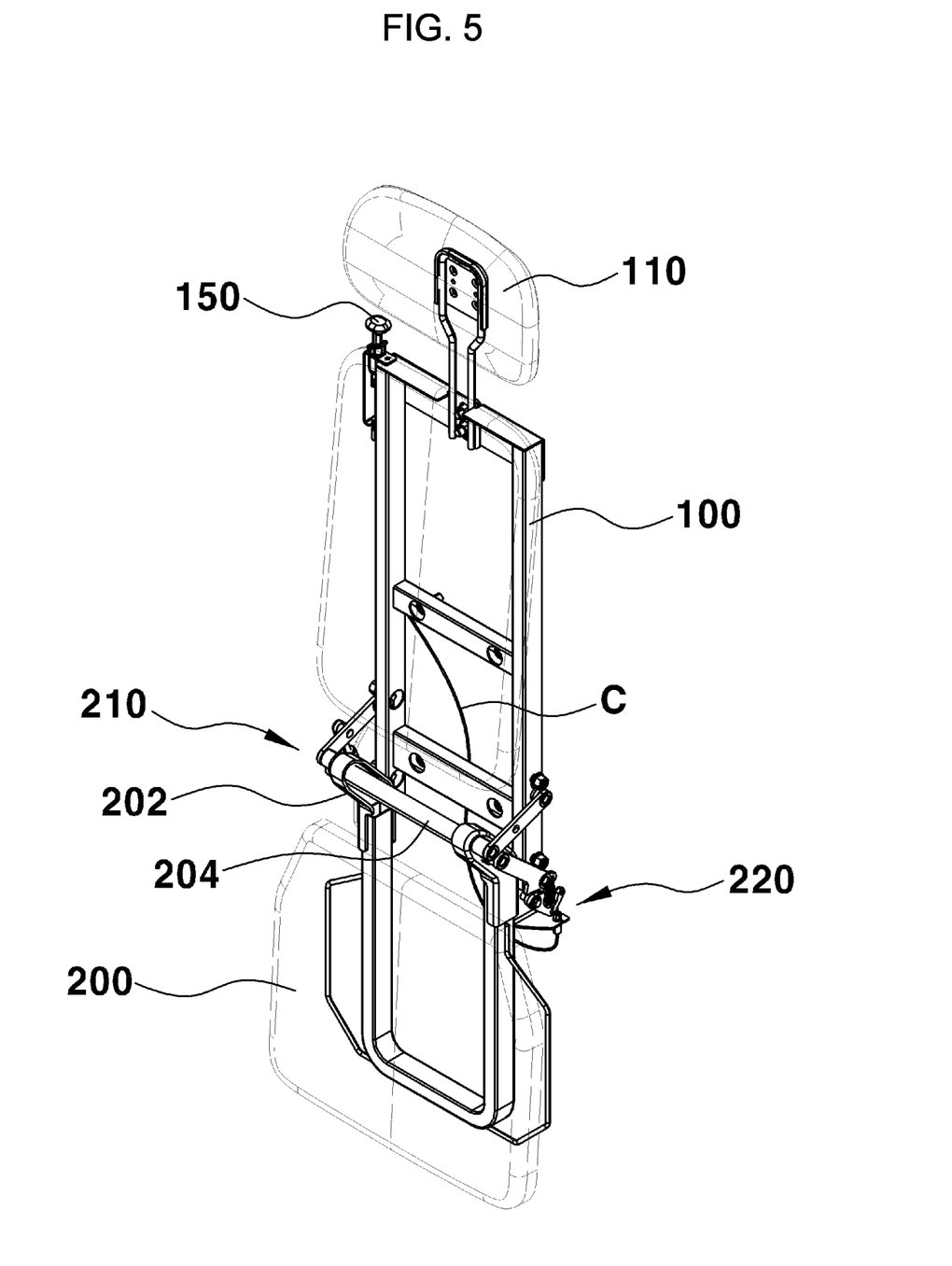
Figure 6:
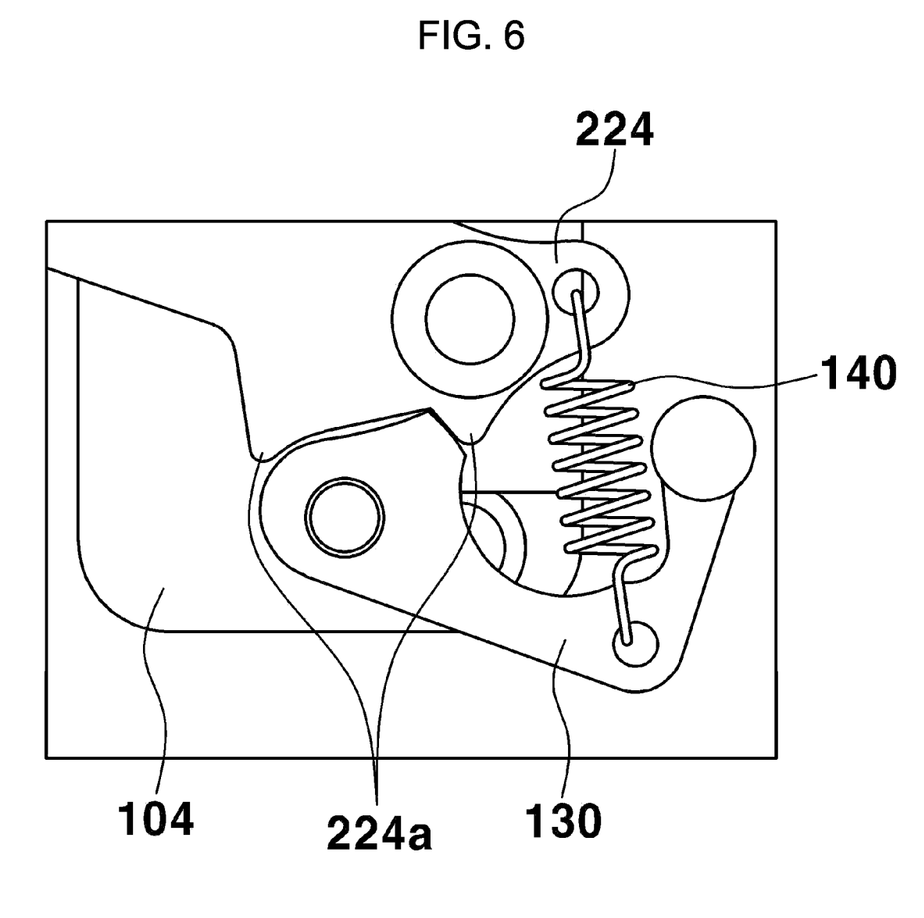
FIGS. 6 to 8 are views sequentially showing the position switching from the seating position to the stowing position with respect to the vehicle foldable seat according to the embodiment of the present apparatus.
Figure 7:
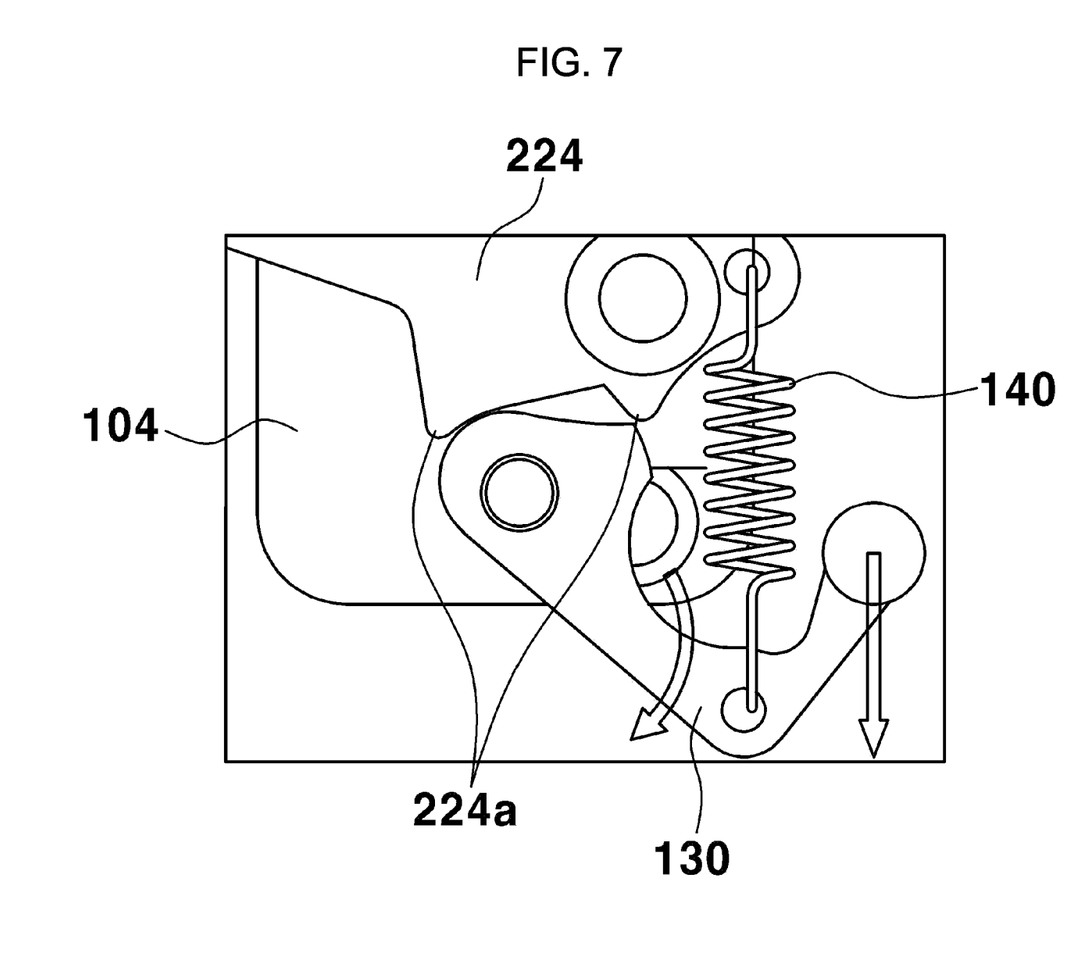
Figure 8:
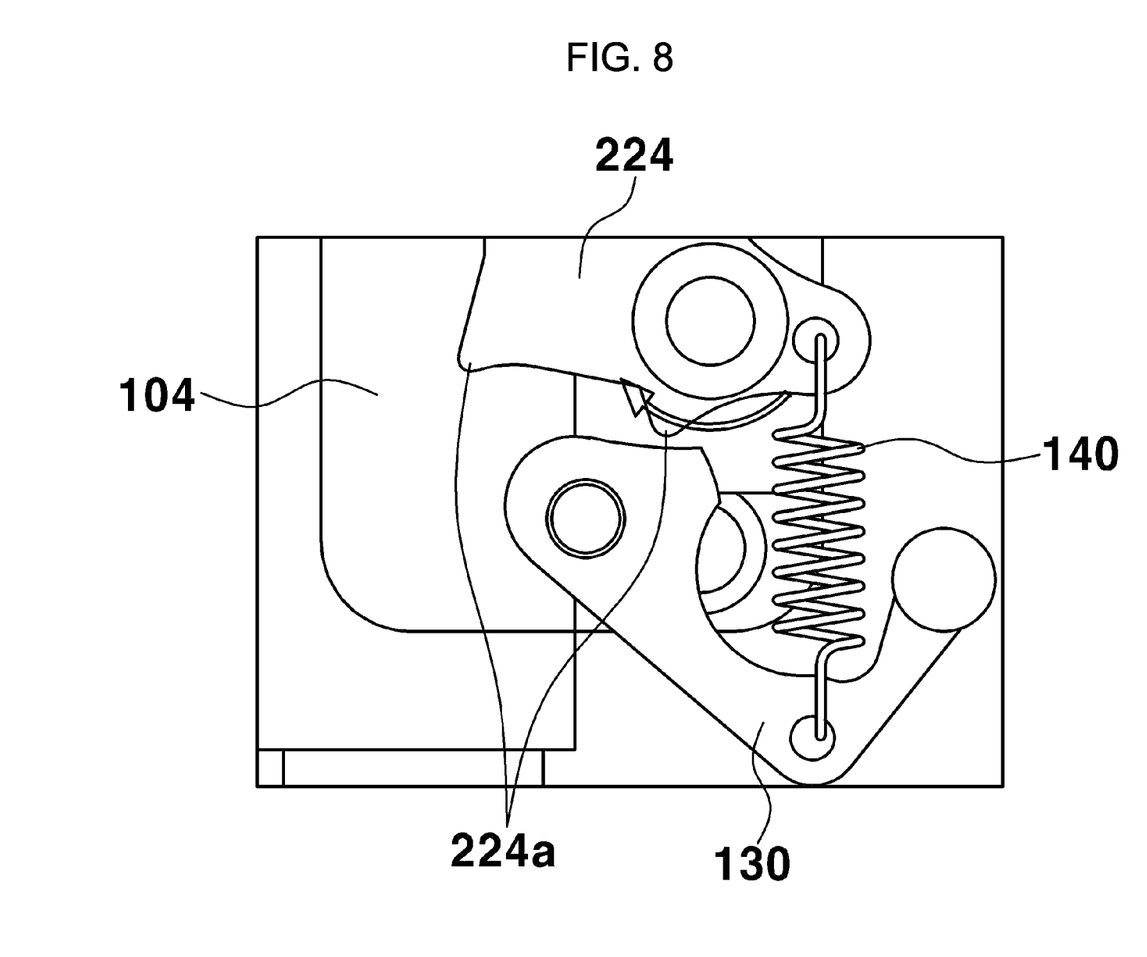
Figure 9:
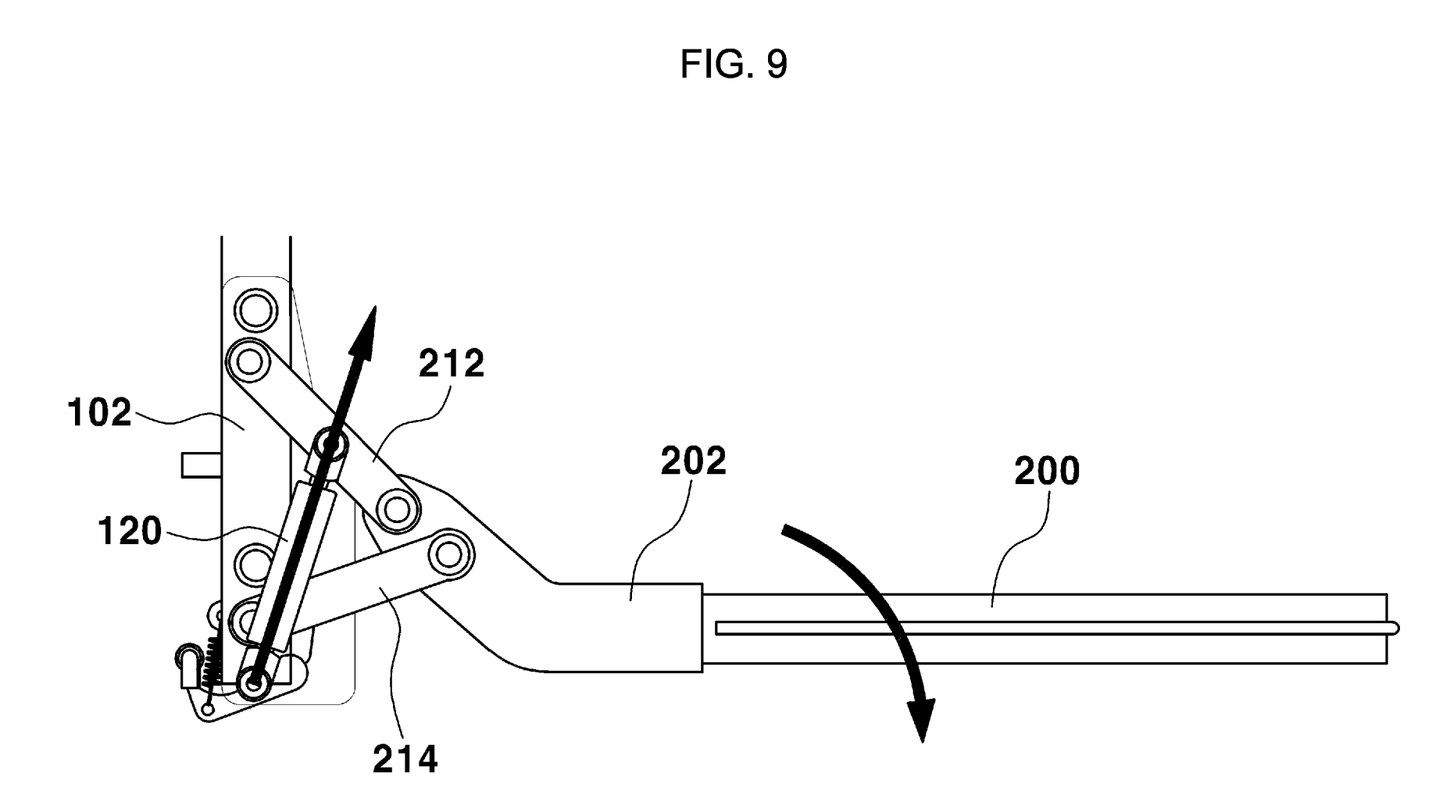
FIGS. 9 and 10 are views showing an operational relationship between the seating position and the stowing position with respect to the vehicle foldable seat according to the embodiment of the present apparatus.
Figure 10:
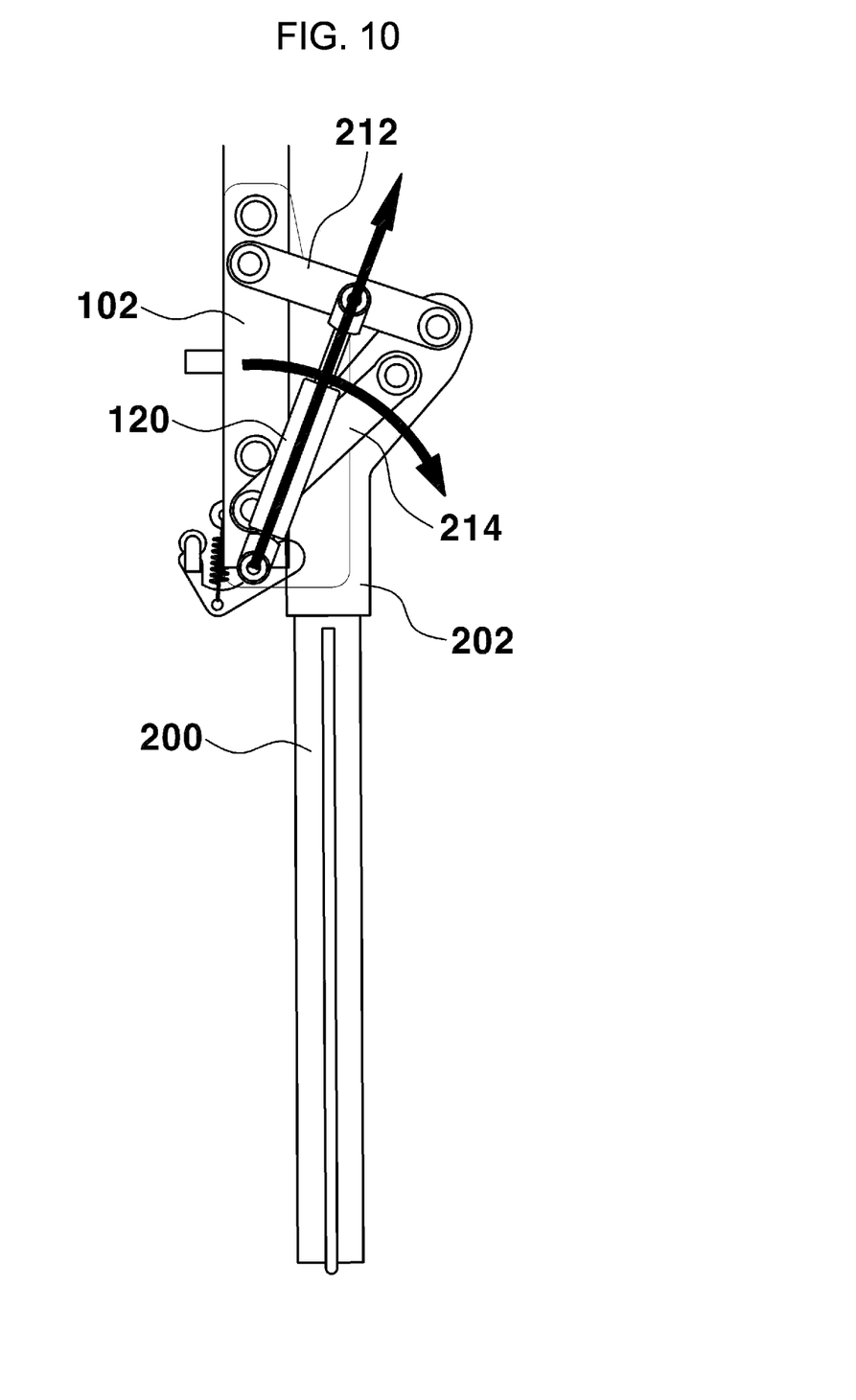

Additionally, FIGS. 4 and 5 are views showing position switching from a seating position to a stowing position with respect to the vehicle foldable seat according to the embodiment of the present apparatus, FIGS. 6 to 8 are views sequentially showing the position switching from the seating position to the stowing position with respect to the vehicle foldable seat according to the embodiment of the present apparatus, and FIGS. 9 and 10 are views showing an operational relationship between the seating position and the stowing position with respect to the vehicle foldable seat according to the embodiment of the present apparatus.

As shown in FIG. 1, the vehicle foldable seat according to the present embodiment is configured to minimize a spatial restriction such as interference at the entrance of a vehicle or the aisle side in the vehicle when not in use, and the same includes a seatback unit 100 and a seat cushion unit 200.

The seatback unit 100 is fixed and configured to support the back of an occupant.

The seatback unit 100 has a headrest 110 connected to an upper portion thereof and configured to protect the head of an occupant, thereby making it possible to simultaneously support the back and the head of an occupant.

The seat cushion unit 200 is hinged to the seatback unit 100 and connected thereto so as to be axially rotatable. Further, the seat cushion unit 200 is fixed by elastic force in a stowing position, and the same is selectively switched to a seating position when fixation of the seat cushion unit 200 is released.

Further, the seat cushion unit 200 is formed to be fixed in the seating position by being selectively engaged with the seatback unit 100.

To this end, the seat cushion unit 200 includes a first link part 210 and a second link part 220.

As shown in FIG. 2, the first link part 210 is connected to a first coupling guide 102 mounted on one side of the seatback unit 100, and the same is formed to be rotatable in the state of being connected thereto by elastic force provided by an elastic member 120 to be described later.

The first link part 210 includes an upper link 212 and a lower link 214.

The upper link 212 connects the seat cushion unit 200, more specifically, a connecting member 202 formed to be inclined and bent among the configurations of the seat cushion unit 200, to the first coupling guide 102. Further, the upper link 212 is formed to be rotatable clockwise by elastic force provided thereto, thereby forming a variable connection angle.

As described above, in order to vary the connection angle by rotating the upper link 212, the seatback unit 100 includes the elastic member 120. Here, the elastic member 120 is coupled to the first coupling guide 102 and is formed to extend to the upper link 212, thereby providing elastic force to continuously rotate the upper link 212 clockwise.

Preferably, the elastic member 120 may be formed of a gas spring.

The lower link 214 has the same shape as the upper link 212 and is spaced apart from the upper link 212. The lower link 214 is disposed at an angle corresponding to the connection angle of the upper link 212 and formed to connect the seat cushion unit 200 to the first coupling guide 102. Here, when the connection angle of the upper link 212 is varied, the connection angle of the lower link 214 is also varied to assist rotation of the seat cushion unit 200. In other words, the lower link 214 is formed to assist rotation from the seating position to the stowing position or rotation from the stowing position to the seating position.

The second link part 220 operates in conjunction with the first link part 210. As shown in FIG. 3, the second link part 220 is connected to a second coupling guide 104 mounted on the other side of the seatback unit 100 and formed to be selectively fixed in the seating position.

The second link part 220 includes an upper link 222 and a lower link 224 in the same manner as the first link part 210.

The upper link 222 has the same shape as the upper link 212 of the first link part 210, and the same connects the connecting member 202 of the seat cushion unit 200 to the second coupling guide 104. Further, as described above, the elastic force provided to the upper link 212 by the elastic member 120 is transmitted to the upper link 222 so as to rotate the upper link 222 clockwise, thereby forming a variable connection angle similarly to the upper link 212.

The lower link 224 connects the seat cushion unit 200 to the second coupling guide 104, and the same is connected to the lower link 214 of the first link part 210 through a connecting bar 204 formed to penetrate the seat cushion unit 200. Here, when the connection angle of the upper link 222 is varied, the connection angle of the lower link 224 is accordingly varied. The lower link 224 is formed to assist rotation of the seat cushion unit 200, that is, rotation from the seating position to the stowing position or rotation from the stowing position to the seating position.

Here, the lower link 224 has a locking area provided by a pair of locking protrusions 224a located at one end of the lower link 225. Here, the locking protrusions 224a are formed to protrude and spaced apart from each other (refer to FIGS. 6 to 8). The locking area is preferably formed to have a width length corresponding to a width length of one end of a locking member 130 to be described later.

That is, the seatback unit 100 includes the locking member 130 rotatably coupled to the second coupling guide 104 and configured to selectively limit rotation of the lower link 224 when the locking member 130 is locked in the locking area. Here, when the locking member 130 is locked in the locking area, fixation of the seat cushion unit 200 in the seating position is maintained.

In other words, since the locking member 130 and the lower link 224 are connected to each other through an elastic member 140, the same pull each other in the direction facing each other. Here, in this state, that is, when the locking member 130 is locked in the locking area in the seating position, the locked state of the locking member 130 may be fixed by elastic force of the elastic member 140. Accordingly, since rotation of the first link part 210 and rotation of the second link part 220 may be maintained in the fixed state, thereby effectively supporting an occupant in the seating position.

Here, the locking protrusion 224a has the outer circumferential surface formed to be rounded so as to have the same shape as the corner of the locking member 130 inserted into the locking area. Accordingly, when the position is switched from the seating position to the stowing position or from the stowing position to the seating position, each rotation movement is smoothly performed to allow the locking member 130 to be unlocked from the locking area or to be locked in the locking area in a state in which elastic force is applied by the elastic member 140, that is, in a state in which force is applied in the mutually pulling direction.

As described above, in consideration of the plurality of configurations of the vehicle foldable seat according to the present embodiment, position switching from the seating position to the stowing position will be sequentially described as follows.

In the seating position as shown in FIG. 1, the locking member 130 constituting the second link part 220 is locked in the locking area, as shown in FIG. 6. In this case, since the lower link 224 and the locking member 130 pull each other by the elastic member 140, the locked state therebetween is stably maintained.

In the first link part 210, as shown in FIG. 9, elastic force of the elastic member 120 acts on the upper link 212 in the arrow direction, and force to rotate the seat cushion unit 200 clockwise is generated. Here, since the locking member 130 is locked in the locking area, the position may be effectively fixed in the seating position by the first link part 210 and the second link part 220. Accordingly, it is possible to stably support an occupant through the seat cushion unit 200.

Here, when the seat cushion unit 200 is switched to the stowing position, the locking member 130 is rotated to allow the lower link 224 to be unlocked from the locking area.

That is, as shown in FIG. 4, when an operating lever 150 is pulled, the locking member 130 is rotated to allow the lower link 224 to be unlocked from the locking area because the operating lever 150 and the locking member 130 are connected to each other by a connecting cable C, as shown in FIG. 7.

When the locking member 130 is unlocked from the locking area, the upper link 212 is rotated clockwise because elastic force is continuously provided through the elastic member 120, and as such the upper link 222 of the second link part 220 is also rotated clockwise by rotational force. Accordingly, when the upper link 222 is rotated as described above, the lower link 224 is also rotated to vary the angle thereof, thereby pulling the connecting member 202 inwards through the connecting bar 204. In this manner, the seat cushion unit 200 is switched to the stowing position (refer to FIG. 4).

Thereafter, when elastic force of the elastic member 120 continuously acts to further rotate the upper link 212, as shown in FIG. 5, the position of the seat cushion unit 200 is switched to the stowing position. In this case, as shown in FIG. 8, the lower links 214 and 224 connected to each other are rotated clockwise, and the locking member 130 is fixed in the state of being unlocked from the locking area through the elastic member 140.

Here, as shown in FIG. 10, since elastic force of the elastic member 120 continuously acts on the upper link 212 in the arrow direction, the connecting bar 204 may be supported by the lower links 214 and 224, and the position of the seat cushion unit 200 may be fixed and maintained in a state of being switched to the stowing position.

When an occupant intends to switch from the stowing position to the seating position, the occupant is required to apply stronger force than elastic force of the elastic member 120 because the seat cushion unit 200 is fixed in the stowing position by the elastic member 120. Accordingly, the seat cushion unit 200 is rotated counterclockwise, and the position thereof is switched to the seating position.

The subsequent steps proceed in the reverse order of a switching process from the seating position to the stowing position. As a result, while the lower link 224 is rotated clockwise, the lower link 224 is locked in the locking area of the locking member 130, and as such rotation of both the locking member 130 and the lower link 224 is limited. In this manner, the seat cushion unit 200 may be fixed and maintained at the switched seating position.

According to the present disclosure, in the stowing mode, a seat cushion is disposed in close contact with the vehicle body in the same manner as a seatback, and the arrangement state of the seat cushion and the seatback is fixed by elastic force of an elastic member. Further, in the seating mode, the seat cushion is axially rotated and is disposed to form a right angle with the seatback. Here, a locking member is locked in a lower link, thereby allowing the seat cushion to be stably fixed in the seating mode. Accordingly, in the seating mode, it is possible to reliably support a seated occupant, and in the stowing mode, the protruding length of the seat is reduced in the interior space, thereby having an effect of effectively securing the interior space.

As is apparent from the above description, according to the present disclosure, in the stowing mode, a seat cushion is disposed in close contact with the vehicle body in the same manner as a seatback so as to stably fix the arrangement state of the seat cushion and the seatback using elastic force of an elastic member. In the seating mode, the seat cushion is axially rotated to form a right angle with the seatback, and a locking member is locked in a lower link, thereby allowing the seat cushion to be stably fixed in the seating mode. Accordingly, in the seating mode, it is possible to reliably support a seated occupant, and in the stowing mode, it is possible to reduce the protruding length of the seat in the interior space, thereby having an effect of effectively securing the interior space.

The present apparatus has been described in detail with reference to preferred embodiments shown in the drawings. However, it will be appreciated by those skilled in the art that changes may be made in these embodiments without departing from the principles and spirit of the present disclosure, the scope of which is defined in the appended claims and equivalents thereto.

What is claimed is:

1. A vehicle foldable seat comprising:
a seatback unit fixable to a vehicle body; and
a seat cushion unit rotatably connected to the seatback unit,
wherein the seat cushion unit is configured to be fixed by elastic force in a stowing position, the seat cushion unit is selectively switchable to a seating position when fixation of the seat cushion unit is released, and the seat cushion unit is configured to be engaged with the seatback unit to be fixed in the seating position,
wherein the seat cushion unit comprises:
a first link part connected to a first coupling guide mounted on one side of the seatback unit and rotated by the elastic force provided thereto; and
a second link part configured to operate in conjunction with the first link part, the second link part connected to a second coupling guide mounted on the other side of the seatback unit, the second link part formed to be selectively fixed at the seating position,
wherein the second link part comprises:
an upper link configured to connect the seat cushion unit to the second coupling guide, wherein the upper link of the second link part is formed to have a second variable connection angle by the elastic force provided thereto; and
a lower link configured to connect the seat cushion unit to the second coupling guide, wherein the lower link of the second link part is connected to the first link part through a connecting bar formed to penetrate the seat cushion unit and formed to assist rotation of the seat cushion unit as the second variable connection angle of the upper link of the second link part varies.

2. The vehicle foldable seat of claim 1, wherein the second variable connection angle is measured relative to a ground.

3. The vehicle foldable seat of claim 1, wherein the first link part comprises:
an upper link configured to connect the seat cushion unit to the first coupling guide, wherein the upper link of the first link part is formed to have a first variable connection angle by the elastic force provided thereto; and
a lower link configured to connect the seat cushion unit to the first coupling guide, wherein the lower link of the first link part is formed to assist rotation of the seat cushion unit as the first variable connection angle of the upper link of the first link part varies.

4. The vehicle foldable seat of claim 3, wherein the seatback unit comprises an elastic member coupled to the first coupling guide and formed to extend to the upper link of the first link part, wherein the elastic member is configured to provide the elastic force to vary the first variable connection angle of the upper link of the first link part.

5. The vehicle foldable seat of claim 3, wherein the first variable connection angle is measured relative to a ground.

6. The vehicle foldable seat of claim 1, wherein the lower link of the first link part comprises a locking area provided by a pair of locking protrusions spaced apart from each other and formed to protrude from the lower link of the first link part.

7. The vehicle foldable seat of claim 6, wherein the seatback unit comprises:

a locking member rotatably coupled to the second coupling guide, wherein the locking member selectively limits rotation of the lower link of the first link part when the locking member is locked in the locking area; and an elastic member formed to provide the elastic force between the locking member and the lower link of the first link part.

8. The vehicle foldable seat of claim 7, wherein each of the locking protrusions has an outer circumferential surface formed to be rounded.

9. The vehicle foldable seat of claim 7, wherein the seatback unit comprises an operating lever connected to the locking member by a connecting cable, and wherein the operating lever is operable to rotate the locking member so that the lower link of the second link part is unlocked from the locking area.

10. A vehicle foldable seat comprising:

a seatback unit fixable to a vehicle body; and a seat cushion unit rotatably connected to the seatback unit, wherein the seat cushion unit is configured to be fixed by elastic force in a stowing position, the seat cushion unit is selectively switchable to a seating position when fixation of the seat cushion unit is released, and the seat cushion unit is configured to be engaged with the seatback unit to be fixed in the seating position, wherein the seat cushion unit comprises:

a first link part connected to a first coupling guide mounted on one side of the seatback unit and rotated by the elastic force provided thereto; and a second link part configured to operate in conjunction with the first link part, the second link part connected to a second coupling guide mounted on the other side of the seatback unit, the second link part formed to be selectively fixed at the seating position, wherein the first link part comprises:

an upper link configured to connect the seat cushion unit to the first coupling guide, wherein the upper link is formed to have a first variable connection angle by the elastic force provided thereto; and a lower link configured to connect the seat cushion unit to the first coupling guide, wherein the lower link is formed to assist rotation of the seat cushion unit as the first variable connection angle of the upper link varies, wherein the seatback unit comprises an elastic member coupled to the first coupling guide and formed to extend to the upper link, wherein the elastic member is configured to provide the elastic force to vary the first variable connection angle of the upper link.

* * * * *